United States Patent
Wu et al.

(10) Patent No.: US 7,585,586 B2
(45) Date of Patent: Sep. 8, 2009

(54) BATTERY

(76) Inventors: I-Long Wu, 6F-1, No. 36, Linsen Rd., Taichung City (TW); Chia-Tien Wu, 6F-1, No. 36, Linsen Rd., Taichung City (TW); Chia-Yun Wu, 6F-1, No. 36, Linsen Rd., Taichung City (TW)

( * ) Notice: Subject to any disclaimer, the term of this patent is extended or adjusted under 35 U.S.C. 154(b) by 388 days.

(21) Appl. No.: 11/211,497

(22) Filed: Aug. 26, 2005

(65) Prior Publication Data

US 2007/0048601 A1 Mar. 1, 2007

(30) Foreign Application Priority Data

Aug. 30, 2004 (TW) .............................. 93125989 A

(51) Int. Cl.
*H01M 4/36* (2006.01)
*H01M 6/32* (2006.01)
*H01M 4/58* (2006.01)

(52) U.S. Cl. .................... 429/101; 429/118; 429/231.6; 429/231.95; 429/229

(58) Field of Classification Search ......... 429/101–105, 429/231.6, 231.95, 229, 118
See application file for complete search history.

(56) References Cited

U.S. PATENT DOCUMENTS

| | | | | |
|---|---|---|---|---|
| 3,871,918 A | * | 3/1975 | Viescou | 429/303 |
| 4,324,636 A | * | 4/1982 | Dankese | 204/296 |
| 6,555,264 B1 | * | 4/2003 | Hamada et al. | 429/156 |
| 6,753,469 B1 | | 6/2004 | Kolawa | |
| 2004/0125527 A1 | * | 7/2004 | Kao | 361/115 |
| 2005/0100785 A1 | * | 5/2005 | Enomoto et al. | 429/174 |

FOREIGN PATENT DOCUMENTS

TW 568363 12/1992

OTHER PUBLICATIONS

DuPont Nafion PFSA Membranes pp. 1-4 NAE101, Feb. 2004.

* cited by examiner

*Primary Examiner*—Patrick Ryan
*Assistant Examiner*—Muhammad Siddiquee
(74) *Attorney, Agent, or Firm*—Muncy, Geissler, Olds & Lowe, PLLC

(57) ABSTRACT

A small current environmental-friendly battery includes a positive electrode substrate and a negative electrode substrate that are conductors of different potentials, in which the positive electrode substrate can activate or ionize water. A film is interposed between the positive electrode substrate and the negative electrode substrate. The ions in water transmit electricity in the battery. The potential difference between the positive electrode substrate and the negative electrode substrate provides electricity of the battery.

11 Claims, 2 Drawing Sheets

BATTERY

FIELD OF THE INVENTION

The present invention relates to a small current environmental-friendly battery and particularly to a battery that has two conductors of different potentials functioning as positive electrode substrate and negative electrode substrate to generate a potential difference and supply electricity.

BACKGROUND OF THE INVENTION

Batteries to provide small current for electronic products are known in the art. For instance, R.O.C. Patent Publication No. TW568363, entitled "Battery to provide small current for electronic products" and U.S. Patent Publication No. 20040125527, entitled "Battery for an electrical appliance that consumes low voltage battery" are such examples. They have two electrodes in contact with active carbon to generate chemical reactions with water to provide electricity. However, no isolation membrane is in between the two electrodes and their structure is complex and difficult to be miniaturized. Short circuit tends to occur between the two electrodes, and the shrunk water container cannot hold a desired amount of water.

SUMMARY OF THE INVENTION

Therefore the primary object of the present invention is to provide a low cost, environmental-friendly battery that can supply small current and can receive replenished water for regeneration.

When two metal conductors having different number of free electrons per unit volume are in contact with each other, a small potential difference about 1 to 10 μV occurs. However, if a moisturized film is sandwiched between the two metal conductors, more than ten thousand times of potential difference can be generated than when the two metal conductors are in contact.

The present invention aims to space two metal conductors through a film at a minimum distance to generate a maximum potential difference, and use ions of water for electric transmission in the battery. A current loop is formed due to the exterior electrons moving through the battery.

If the metal conductor that serves as the positive electrode substrate can activate or ionize water, or an additive that can activate or ionize water is added, current can increase. The additive is an infrared nano ceramics or a nano anion material. The nano material has quantum effect, high surface activity and alterable chemical characteristics that are different from the conventional material.

In the general battery, the negative electrode substrate and the electrolyte are in contact to generate chemical reactions and gradually form an insulation compound on the surface of the negative electrode substrate. As a result, the negative electrode substrate gradually loses conductivity. The present invention has a proton exchange membrane coating on the metal conductor which serves as the negative electrode substrate to prevent oxidation of the negative electrode substrate.

The present invention integrates the concept of quantum theory, nano material characteristics, fuel cell technology and electrochemical techniques, and uses water as the electrolyte to form a battery.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
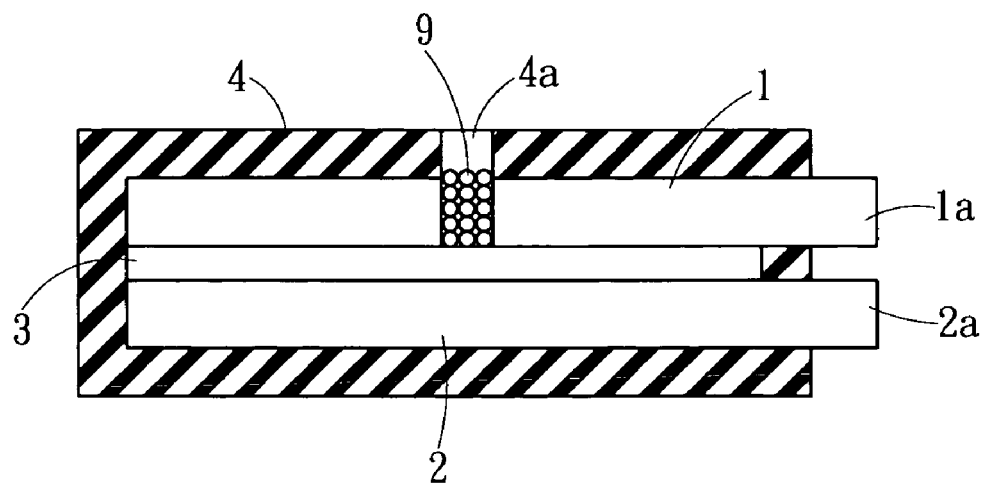
FIG. 1 is a sectional view of a first embodiment of the present invention formed in a cubical profile.

Referring to FIG. 1, the battery according to the invention includes a positive electrode substrate 1, a negative electrode substrate 2, a film 3, and an insulation shell 4. The film 3 is interposed between the positive electrode substrate 1 and the negative electrode substrate 2 to make the positive electrode substrate 1 spacing from the negative electrode substrate 2 at a minimum distance. The insulation shell 4 encases the positive electrode substrate 1, the negative electrode substrate 2 and the film 3 to keep them closely in contact with one another and hold them together. The insulation shell 4 has a water inlet 4a on a desired location to replenish water for the film 3. The positive electrode substrate 1 and the negative electrode substrate 2 are formed by two conductors of different potentials. The positive electrode substrate 1 can activate or ionize water in the electrolyte so that the ions of the water can transfer electricity in the battery. When the positive electrode substrate 1 and the negative electrode substrate 2 are spaced from each other at the minimum distance, they can generate a maximum potential difference between them and output through distal end 1a and 2a thereof to become the source of electricity of the battery.

Moreover, an additive 9 which can activate or ionize water may be added through the water inlet 4a. The additive 9 may be infrared nano ceramics, nano anion material, nano carbon, active carbon, that can emit electromagnetic wave, or acid root or a mixing compound thereof. The electromagnetic wave can split larger water molecule clusters to smaller water molecule clusters, especially in the spectrum proximate to the infrared light. The water of the smaller molecule clusters carries a great amount of kinetic energy, moves very fast, has a greater capability to dissolve oxygen and stronger osmosis and dissolution power. The nano anion material also can split the larger water molecule clusters to the smaller water molecule clusters, and enable the water molecules to generate a weak electrolysis. The acid root can react with the water to generate hydrogen ions. The additive 9 is a weak acid root that does not have harmful effect to the environment. The positive electrode substrate 1 is a conductor which can emit electromagnetic wave, or formed by mixing the material of the additive 9 (except the acid root) in the form of conductive particles or fibers according to a desired ratio.

Figure 2:
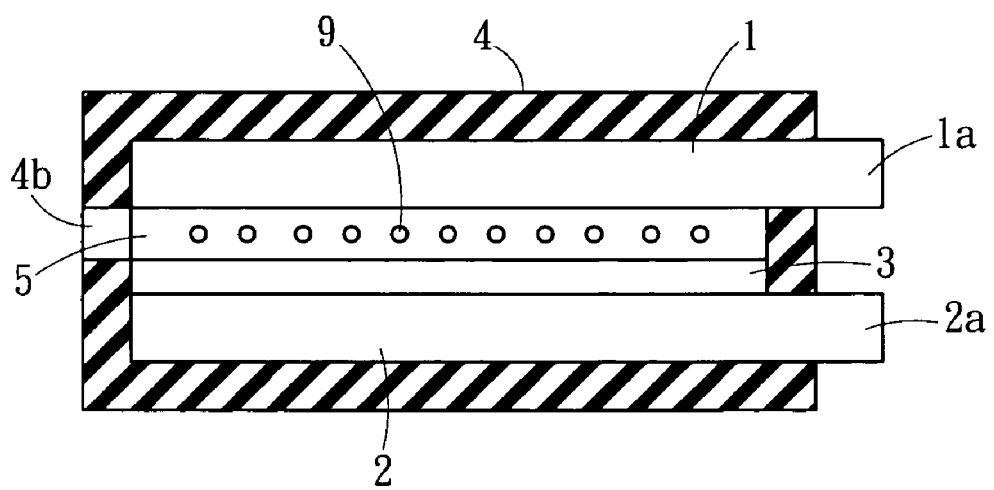
FIG. 2 is sectional view of a second embodiment of the present invention formed in a cubical profile.

Referring to FIG. 2, a water absorbing substance 5 is added between the positive electrode substrate 1 and the film 3 to increase water storage. Moreover, the insulation shell 4 has a water inlet 4b to replenish water for the water absorbing substance 5. The water absorbing material 5 also contains the additive 9.

Figure 3:
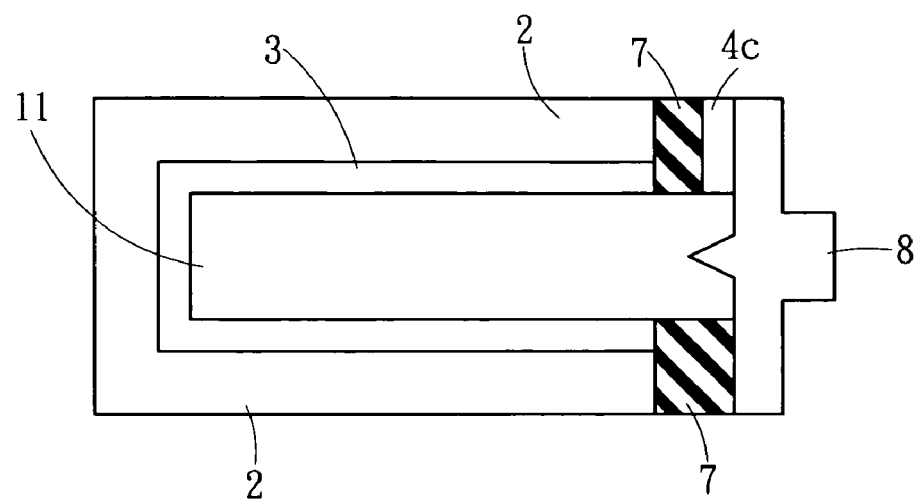
FIG. 3 is a sectional view of a third embodiment of the present invention formed in a barrel.

Referring to FIG. 3, the positive electrode substrate 11 is a water absorbing conductor which can activate or ionize water. The film 3 is coated on the negative electrode substrate 2, then the positive electrode substrate 11 is filled. A conductor 8 is in contact tightly with the positive electrode substrate 11. There is an insulation member 7 between the conductor 8 and the negative electrode substrate 2 to prevent short circuit. The conductor 8 is oxidation-resistant and the insulation member 7 has a water inlet 4c for replenishing water. The water absorbing conductor that can activate or ionize water has porous structure, such as active carbon or fibers thereof. Besides having high porosity structure, it also can emit infrared light. On the other hand, the negative electrode substrate 2 coated by the film 3 can also be filled in the positive electrode substrate 11 by adding water to the positive electrode substrate 11 on the outer side. The additive 9 may also be added to the positive electrode substrate 11 to increase the efficiency of water activation or ionization.

Figure 4:
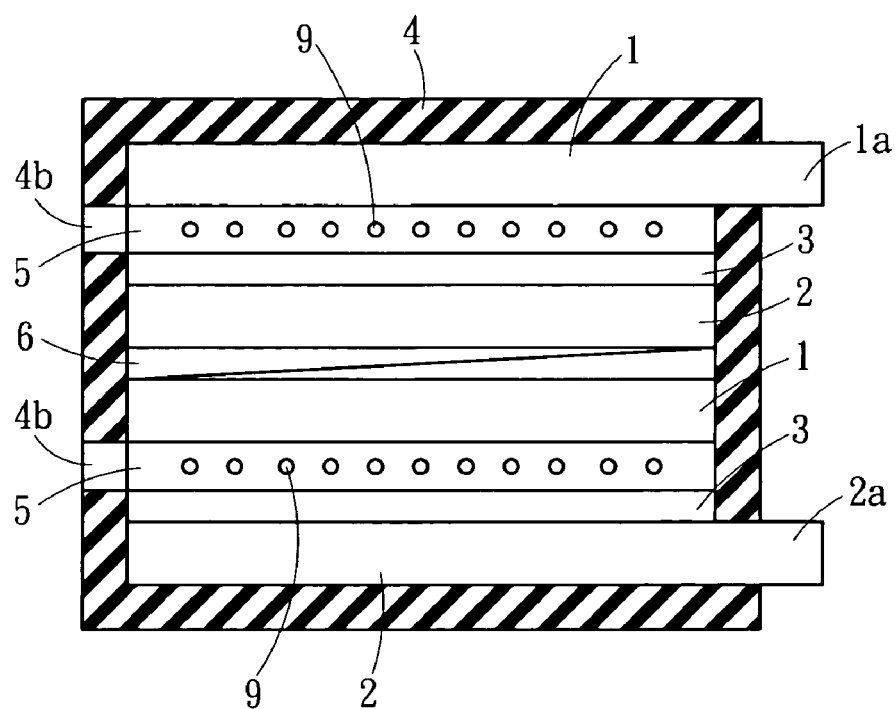
FIG. 4 is a sectional view of the present invention formed in a cubical profile and has the interior coupled in series.

Like the ordinary battery, the invention can also be coupled in series and parallel. Refer to FIG. 4 for an embodiment of the invention coupled in series. In the insulation shell 4, there are two sets of positive electrode substrates 1, negative electrode substrates 2, films 3, water inlets 4b and water absorbing substance 5. The two neighboring sets are interposed by a conductor 6 that is oxidation-resistant. The neighboring positive electrode substrate 1 and negative electrode substrate 2 are connected. Voltage can be obtained on the distal ends 1a and 2a.

When the potential difference between the positive electrode substrate 1 and the negative electrode substrate 2 is greater, the voltage being generated is higher. Hence the positive electrode substrate 1 is preferably made of a material of a low potential, while the negative electrode substrate 2 is made of a material of a high potential (such as selected from the group consisting of aluminum, zinc, alloy composing of at least aluminum or zinc, lithium, magnesium, lithium-magnesium and alloy thereof). The material with low potential is oxidation-resistant, while material with higher potential is more likely to be oxidized. Hence the negative electrode substrate 2 is coated with a osmotic layer which can only transmit hydrogen ions, such as the Proton Exchange Membrane (Nafion) produced by Dupont Co., to prevent oxidation. The electrolyte mainly is water, or weak acid that is not harmful to the environment.

The film 3 of the invention is porous and directly coated on the negative electrode substrate 2. It mainly aims to provide isolation so that the positive electrode substrate 1 and the negative electrode substrate 2 can be spaced with each other at the minimum distance. The thinner the film 3, the greater the potential difference is formed between the positive electrode substrate 1 and the negative electrode substrate 2. It also can prevent oxidation of the negative electrode substrate 2. The film 3 may be a osmosis membrane, a proton exchange membrane, or a porous coating formed on the negative electrode substrate 2 by a conversion coating process.

The invention provides an optimal structure that includes a positive electrode substrate which is a water absorbing conductor of a low potential and can activate and ionize water, a negative electrode substrate which is a conductor of a high potential, a osmotic film coated on the negative electrode substrate that can transmit only hydrogen ions, an additive which can activate and ionize water and water which is replenished continuously to produce regeneration and supply electricity.

When adopted on products, the invention can be miniaturized through the techniques of thin film or thick film. Various combinations and assemblies can be formed according to product sizes, costs and different utilization requirements. The principle is the same.

In summary, the invention integrates the concept of quantum theory, nano material characteristics, fuel cell technology and electrochemical techniques, and uses water as the electrolyte to form a battery.

What is claimed is:

1. A battery, comprising:
a positive electrode substrate, which is a conductor of a low potential;
a negative electrode substrate which is a conductor of a high potential;
an additive to activate or ionize water in an electrolyte;
a film which is porous and located between the positive electrode substrate and the negative electrode substrate to space the positive electrode substrate and the negative electrode substrate at a minimum distance said film being an osmotic membrane coating on the negative electrode substrate;
an insulation shell which encases the positive electrode substrate and the negative electrode substrate and has at least one water inlet to add the electrolyte to the film, and keeps the positive electrode substrate and the negative electrode substrate in contact with each other tightly together; and
a water absorbing substance located between the positive electrode substrate and the film to store water for moisturizing;
wherein ions generated by the ionized water transmit electricity in the battery, the positive electrode substrate and the negative electrode substrate that being spaced from each other at the minimum distance generate a maximum potential to provide electricity of the battery.

2. The battery of claim 1, wherein the positive electrode substrate is a conductor capable of emitting electromagnetic wave.

3. The battery of claim 1, wherein the positive electrode substrate is made of a material selected from the group consisting of infrared nano ceramics, nano anion material, nano carbon, active carbon, and a mixing compound thereof that are formed in one of conductive particles and fibers and mixed according to a desired ratio.

4. The battery of claim 1, wherein the positive electrode substrate is made from active carbon which can emit infrared light, the negative electrode substrate being selected from the group consisting of aluminum, zinc, alloy composing of at least aluminum or zinc, lithium, magnesium, lithium-magnesium and alloy thereof.

5. The battery of claim 1, wherein the positive electrode substrate is a water absorbing conductor capable of activating or ionizing water, and is filled in the negative electrode substrate, said negative electrode substrate is covered by the film.

6. The battery of claim 1, wherein the positive electrode substrate is a water absorbing conductor which can activating or ionizing water, and the negative electrode substrate is covered by the film and filled in the positive electrode substrate.

7. The battery of claim 1, wherein the osmotic membrane transmits only hydrogen ions and prevents the negative electrode substrate from oxidizing.

8. The battery of claim 1, wherein the film is a porous coating formed on the negative electrode substrate by a conversion coating process.

9. The battery of claim 1, wherein the additive is selected from the group consisting of infrared nano ceramics, nano anion material, nano carbon, active carbon, acid root and a mixing compound thereof.

10. The battery of claim 1, wherein a plurality sets of the positive electrode substrate, the film, the negative electrode substrate and the water inlet are formed and coupled in series, two neighboring positive electrode substrates and negative electrode substrates being connected through a conductor which is oxidation-resistant, an accumulated voltage being presented on the positive electrode substrate and the negative electrode substrate that are located on outmost two sides.

11. The battery of claim 1, wherein the positive electrode substrate is a conductor capable of activating or ionizing water in an electrolyte.

* * * * *